May 2, 1950     C. L. AUGHEY ET AL     2,505,933
PRESSURE LIMITING THERMOSTATIC EXPANSION VALVE
Filed June 16, 1944     2 Sheets-Sheet 2
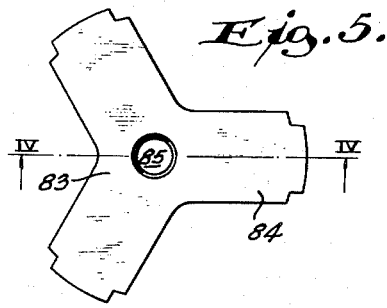
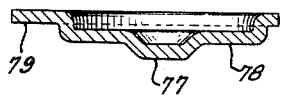
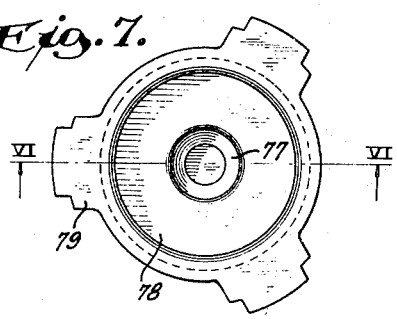
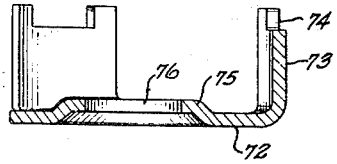
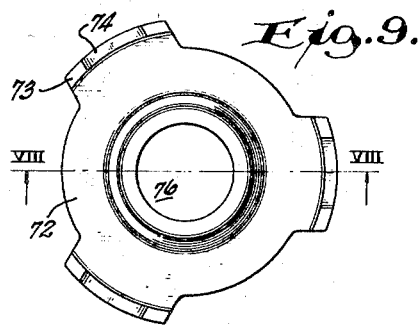
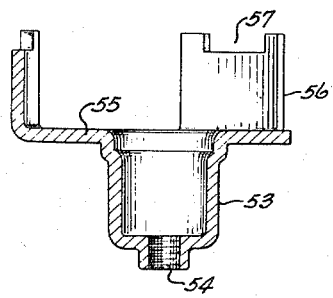
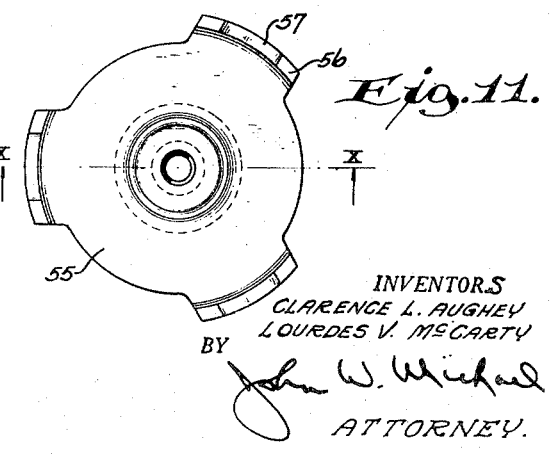

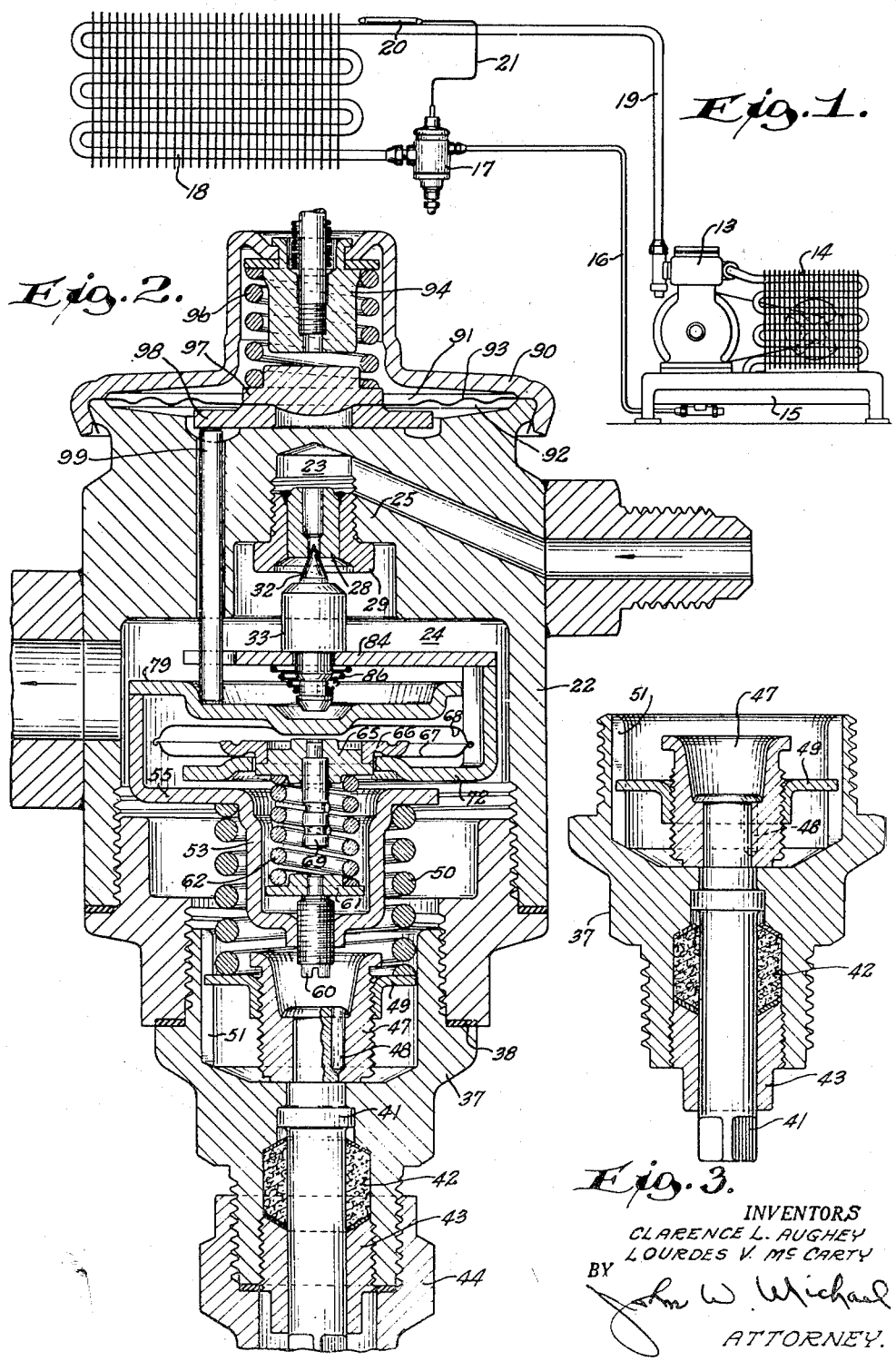

Patented May 2, 1950

2,505,933

UNITED STATES PATENT OFFICE 2,505,933

PRESSURE LIMITING THERMOSTATIC EXPANSION VALVE

Clarence L. Aughey and Lourdes V. McCarty, Milwaukee, Wis., assignors to Automatic Products Company, Milwaukee, Wis., a corporation of Wisconsin Application June 16, 1944, Serial No. 540,701

13 Claims. (Cl. 62—8)

This invention relates to improvements in valves for controlling the flow of refrigerant from the compressing-condensing unit to the evaporator of a refrigerating system and which are known as "thermostatic expansion valves."

One object of the invention is to provide a thermostatically actuated valve which will close when the pressure of the refrigerant in the evaporator reaches a predetermined value regardless of the condition of the thermostatic actuating means.

Another object of the invention is to provide a thermostatically actuated valve for a refrigerating system in which the action of the thermostatic actuating means is superseded by means responsive to rises in pressure above a predetermined value in a portion of the system.

Another object of the invention is to provide a pressure-regulating valve for controlling the flow of refrigerant between the compressor-condensing unit and the evaporator of a refrigerating system in which the valve is normally actuated by thermostatic means which is superseded by means responsive to the pressure of the refrigerant in a part of the system and in which the desired action is obtained regardless of whether the valve is at a higher or lower temperature than the thermostatic means.

Objects and advantages other than those above set forth will be apparent from the following description when read in connection with the accompanying drawings, in which:

Fig. 1 diagrammatically represents a compression type of refrigerating system showing the relation of the compressor-condensing unit and the evaporator thereof with the valve of the present invention.

Fig. 2 is a vertical cross sectional view taken substantially on a central plane through the valve with some of the parts in elevation;

Fig. 3 is a vertical sectional view of one sub-assembly of parts of the valve;

Fig. 4 is a vertical sectional view on the plane of the line IV—IV of Fig. 5 which is a top view of one of the valve parts making up another sub-assembly thereof;

Fig. 6 is a vertical sectional view on the plane of the line VI—VI of Fig. 7 which is a top view of one of the valve parts making up the said another sub-assembly thereof;

Fig. 8 is a vertical sectional view on the plane of the line VIII—VIII of Fig. 9 which is a top view of one of the valve parts making up the said another sub-assembly thereof; and Fig. 10 is a vertical sectional view on the plane of the line X—X of Fig. 11 which is a top view of one of the valve parts making up the said another sub-assembly.

Referring more particularly to the drawings by characters of reference, the reference numeral 13 designates the compressor of a compression-condensing-evaporating refrigerating system. The compressor 13 is connected with a condenser 14 into which the hot compressed refrigerant is discharged and in which heat is extracted from the refrigerant to cause liquefaction thereof. The liquefied refrigerant is discharged from the condenser into a receiver 15 which is connected by a pipe 16 and a pressure regulating or expansion valve, generally indicated at 17, with the evaporator 18 of the refrigerating system, the refrigerant vaporized in the evaporator 18 being returned to the suction side of the compressor 13 by way of a pipe 19. The expansion valve 17 is controlled by a thermostatic means which includes a bulb 20 secured to the gas return line 19 and connected with the valve 17 by a tube 21. The bulb 20 and the chamber of the valve 17, to which the bulb is connected by tube 21, are filled with a gas or liquid which expands and contracts responsive to changes in the temperature and are part of means for normally actuating the expansion valve.

The expansion valve 17 includes a casing 22 which is divided into an inlet chamber 23 and an outlet chamber 24 by a partition 25. The partition 25 is formed with a screw-threaded port in which is mounted a valve seat formed by a seat portion 28 secured in a seat retainer 29 screwed into the port in the partition 25. The orifice of the valve seat 28 is controlled by a needle valve 32 mounted in a valve holder 33.

The valve 32 is controlled jointly by means responsive to the pressure of the refrigerant in the evaporator 18 and means actuated by the thermostatically responsive gas or liquid in the bulb 20 and tube 21. The evaporator pressure limiting means is located in the outlet chamber 24 of the expansion valve and supports the valve holder 33. The outlet chamber 24 is closed (see Fig. 3) by a closure member 37 screw-threaded into the end of the valve casing and sealed thereagainst by means of a gasket 38. The closure member 37 is provided with a central aperture through which an adjusting stem 41 extends. The stem 41 is sealed in the closure member 37 by means of a packing gland comprising packing 42 compressed about the stem by a follower 43 and the stem is protected against accidental movement during use by a cap 44 mounted on the closure member. The interior end of the adjusting stem 41 has a cup-shaped member 47 keyed thereto, as indicated at 48, for rotation therewith. The cup member 47 is screw-threaded on the exterior thereof to receive a seat 49 for a spring 50 and is held against rotation by engagement with a rib 51 on member 37.

The spring 50 provides a support for the pressure-limiting means on which the needle valve 32 and its holder 33 are mounted and which comprises generally a supporting frame (see Figs. 4 to 11, inclusive) and a pressure-responsive element adjustably mounted therein. The supporting frame includes a lower cup member (Figs. 10 and 11) having a portion 53 which has a screw-threaded aperture 54 in its lower end. The cup member is formed with a flange 55 resting on the spring 50 and having ears 56 extending therefrom and formed with notches 57 in one edge of the ears. An adjusting screw 60 is threaded into hole 54 and carries a plate 61 forming a seat for a spring 62. The spring 62 acts on a pressure pad 65 joined to a ring 66 on which are mounted a pressure responsive element shown as spaced diaphragms 67 and 68 joined at their edges. The space within the diaphragms is filled with an expansible fluid through a tube 69 in the pressure pad which is then closed by pinching off the tube and soldering or plugging the end. It will be understood that a spring may be placed between the diaphragms 67 and 68 if necessary to prevent collapse thereof, dependent on the relation of the internal and external pressures acting thereon.

The pressure-responsive element 65 to 69, inclusive, rests on an upper cup with an apertured bottom 72 and with ears 73 extending from the bottom and formed with notches 74 in their upper edge. The cup bottom 72 has a raised portion 75 around an opening 76 to form a seat for the pressure-responsive diaphragm structure without interference with the flexibility of the diaphragm. The upper diaphragm 68 of the pressure-responsive element is formed with a seat for receiving a boss 77 on the bottom of a lower plate 78 which is also somewhat cup-shaped and has ears 79 extending from the rim for engagement in the notches 57 of the lower cup member. An upper plate 83 is formed with arms 84 engaging in the notches 74 of the upper cup member 72 and has a hole 85 therethrough to receive the valve retainer 33 which is movably positioned in the hole by a spring 86 to allow exact alignment of the valve and its seat.

The valve casing 22 is provided with a bonnet 90 which encloses a space divided into an upper chamber 91 and a lower chamber 92 by a flexible member shown as a diaphragm 93. The chamber 91 is under the action of the expansive fluid in the bulb 20 and tube 21, the tube 21 being connected with the bonnet by a connector 94. The diaphragm 93 is preferably biased into expanded position by a spring 96 acting between a flange on the tube connector 94 and a pressure pad 97 on the diaphragm 93. It will be understood that the bonnet 90 and the diaphragm 93 may be secured to the valve casing 22 by shaping the peripheries thereof over a flange on the casing as shown, or by any other suitable manner, which will produce a gas-tight joint between the casing, the bonnet, and the diaphragm. The pressure pad 97 holds the diaphragm 93 in contact with a pressure ring 98 resting upon push pins 99 which extend in spaced relation through openings in the casing partition 25 into contact with the lower plate 78 of the pressure-limiting means mounting.

The pressure relations present in the various chambers in the valve will be readily understood by consideration of the pressures in the portions of the system to which such chambers are connected. The inlet chamber 23 of the valve is connected with the condensed refrigerant receiver 15 and is under the pressure of the liquefied refrigerant in the receiver. The outlet chamber 24 of the valve is under the pressure of refrigerant which is partially gasified by passing through the orifice of the valve seat 28 and which is fully gasified by the absorption of heat in the evaporator 18. The chamber 91 in the valve bonnet 90 is under pressure of the fluid in the temperature-responsive bulb 21. And the chamber 92 in the valve bonnet is under the pressure of the outlet chamber 24, such pressure acting through the passages for the push pins 99. Chamber 92 may also, of course, be connected directly with the evaporator 18, thus more easily equalizing the pressures in chambers 24 and 92 than is possible merely by leakage along the push pin passages.

The valve 32 is shown in the closed position assumed at high pressure (above a given value) in evaporator 18 and at high pressure in bulb 20 due to a high temperature about the bulb. Due to the high temperature of the bulb 20, the pressure in chamber 91, plus the force of the spring 96, initially overbalances the evaporator pressure in the chamber 92 and forces the diaphragm 93 down until the ring 98 seats on the casing partition 25. Hence the pins 99 are pressed down on the plate 78 and the cup 55 is pressed down against the force of the spring 50. But as soon as the pressure in the evaporator exceeds a given value, such pressure partially collapses contractible and expansible chamber 67—68 and the spring 62 lifts the cup 72 and its plate 83 to lift the valve 32 to closed position Assuming now that the temperature about the bulb, and hence the pressure in the bulb 20, remains high, the evaporator pressure decreases as the compressor operates with the valve closed. Hence, the flexible walls of chamber 67—68 now expand and the cup 72 and its plate 83 are pressed against the force of the spring 62 so that the valve 32 is carried down until it comes to rest on the plate 78 with the valve in open position. Refrigerant now flows to the evaporator but continued action of the compressor keeps the evaporator pressure down and evaporation of the refrigerant lowers the temperature about the bulb 20. The pressure in chamber 91 now decreases so that such pressure plus the action of the spring 96 is now overbalanced by the pressure in chamber 92 plus the action of the spring 50 and the valve 32 is again closed by upward movement of the several cups under the actions of the springs 50 and 62. So long as the evaporator pressure is below a given value, the chamber 67—68 is ineffective and the valve is actuated only in response to movement of diaphragm 93 in a manner well known in the expansion valve art and hence is responsive to the changes in the temperature about the bulb 20 only.

The positioning or setting of the pressure-limiting means mounting within the casing chamber 24 is determined by the position of the spring seat 49 which controls the degree of compression of the mounting supporting spring 50. The position of the spring seat is adjusted by rotation of the adjusting stem 41 and the cup 47 keyed thereto, and such adjustment determines the superheat at which the expansion valve will function. The pressure at which the pressure limiting means becomes effective to supersede the action of the thermostatic means is determined by the degree of compression of the spring 62 which is adjusted by positioning the screw 60.

From the above description it will be seen that the present invention provides a valve in which the flow of the vaporizable liquid is controlled jointly by means responsive to the pressure in a given space and means responsive to the temperature of the same or another space. So long as the system to which the valve is applied is operating under the normal and usual conditions, the valve is actuated only by the temperature-responsive means, but as soon as a pressure above a predetermined value exists in the system, the action of the temperature-responsive means is superseded by means responsive to such pressure. And the above control of the valve is attained regardless of temperature differences existing between the temperature responsive means and the valve.

The structure by which the above results are obtained is particularly advantageous in that the action of the pressure-responsive means is readily adjusted to a predetermined range at the factory and is further adjustable when mounted to be responsive to the pressure selected for any given installation. The valve can never lose control of system operation because the temperature-responsive means is so charged that some expansible liquid always remains in such means.

Although but one embodiment of the present invention has been illustrated and described, it will be apparent to those skilled in the art that various changes and modifications may be made therein without departing from the spirit of the invention or from the scope of the appended claims.

We claim:

1. In a control device connected between the compression unit and the evaporator of a refrigerating system, a casing having a partition therein with an orifice and a chamber on the discharge side of the orifice, a valve controlling the flow of refrigerant through the orifice, a valve supporting structure mounted in the chamber, a spring positioning the supporting structure in the chamber, a pressure responsive element mounted in the supporting structure, a spring positioning the pressure responsive element in the supporting structure, and means responsive to the temperature of the evaporator and cooperating with the pressure responsive means to control the movement of the valve.

2. In a control device connected between the compression unit and the evaporator of a refrigerating system, a casing having a partition therein with an orifice and a chamber on the discharge side of the orifice, a valve controlling the flow of refrigerant through the orifice, a valve supporting structure mounted in the chamber, a diaphragm subjected on one side to a pressure corresponding to the evaporator temperature and subjected on the other side to the pressure in the evaporator, means transmitting movement of the diaphragm to the valve supporting structure, and means mounted in the valve supporting structure and responsive to the evaporator pressure for coacting with the diaphragm to control the movement of the valve.

3. In a control device for connection between the compression unit and the evaporator of a refrigerating system, a casing having inlet and outlet chambers, a valve controlling the flow of a refrigerant from the inlet chamber to the outlet chamber, means responsive to the pressure in the evaporator for acting on the valve, and means responsive to the difference between the pressure in the evaporator and a pressure varying as a function of the temperature adjacent the evaporator outlet and acting through the first said means in controlling movement of the valve.

4. In a control device for connection between the compression unit and the evaporator of a refrigerating system, a casing having an inlet and an outlet chamber therein, a valve controlling the flow of refrigerant into the outlet chamber, means mounted in the casing and responsive to the pressure of the evaporator above a given value, and means associated with the casing and responsive to the difference between the pressure in the evaporator and a pressure varying as a function of the temperature adjacent the evaporator, the last said means acting through the first said means in controlling the movement of the valve.

5. In a control device for connection between the compression unit and the evaporator of a refrigerating system, a casing, a valve controlling the flow of refrigerant through the casing, means mounted in the outlet chamber and defining a chamber contractible and expansible responsive to increase and decrease respectively of the pressure in the evaporator above a given value, and means mounted in the casing responsive to the difference between the pressure in the evaporator and a pressure varying as the temperature adjacent the evaporator varies, the second said means acting through the first said means in controlling movement of the valve.

6. In a control device for connection between the compression unit and the evaporator of a refrigerating system, a casing, a valve controlling the flow of refrigerant through the casing, a flexible walled chamber mounted in the casing and contractible and expansible responsive to increase and decrease respectively of the pressure in the evaporator above a given value, means adjustably supporting the valve and the chamber within the casing, and means responsive to the difference between the pressure in the evaporator and a pressure varying as the temperature adjacent the evaporator varies, the chamber and the last said means coacting in controlling movement of the valve.

7. In a control device for connection between the compression unit and the evaporator of a refrigerating system, a casing, a valve controlling the flow of refrigerant through the casing, a plurality of diaphragms joined in spaced relation to form a chamber varying in capacity responsive to change of pressure in the evaporator above a given value, means movably supporting the valve and the chamber and actuated by the chamber for acting on the valve, and means responsive to the difference between the pressure in the evaporator and a pressure varying as the temperature adjacent the evaporator varies and coacting with the variable chamber in controlling movement of the valve.

8. In a control device for connection between the compression unit and the evaporator of a refrigerating system, a casing, a valve controlling the flow of refrigerant through the casing, a plurality of diaphragms joined in spaced relation to form a chamber varying in capacity responsive to change of pressure in the evaporator above a given value, a spring mounted in the casing, means supported by the spring for movably supporting the valve and the variable chamber and actuated by the chamber for acting on the valve, and means responsive to the difference between the pressure in the evaporator and a pressure varying as the temperature adjacent the evaporator varies and coacting with the variable chamber in controlling movement of the valve.

9. In a control device for connection between the compression unit and the evaporator of a refrigerating system, a casing, a valve controlling the flow of refrigerant through the casing, a plurality of diaphragms joined in spaced relation to form a chamber varying in capacity responsive to change of pressure in the evaporator above a given value, a spring mounted in the outlet chamber and adjustable from the exterior of the casing, a frame of relatively movable members supported by the spring and movably supporting both the valve and the variable chamber, the variable volume chamber acting on the valve to close the valve when the evaporator pressure exceeds said given value, and means responsive to the difference between the pressure in the evaporator and a pressure varying as a function of the temperature adjacent the evaporator and acting through the variable chamber in controlling movement of the valve.

10. In a control device for connection between the compression unit and the evaporator of a refrigerating system, a casing, a valve controlling the flow of refrigerant through the casing, a flexible walled chamber varying in capacity responsive to change of pressure in the evaporator above a given value and a spring mounted in the outlet chamber and adjustable from the exterior of the casing, a lower cup supported by the spring, an upper cup movably supported on the lower cup and supporting both the valve and the variable chamber, the upper cup serving to transmit movement of the variable chamber to the valve to close the valve when the evaporator pressure exceeds said given value, and means responsive to the difference between the pressure in the evaporator and a pressure varying as a function of the temperature adjacent the evaporator and coacting with the variable chamber in controlling movement of the valve.

11. In a control device for connection between the compression unit and the evaporator of a refrigerating system, a casing, a valve controlling the flow of refrigerant through the casing, a chamber varying in capacity responsive to change of pressure in the evaporator above a given value, a lower cup adjustably mounted in the outlet chamber, a spring adjustably mounted in the lower cup, an upper cup supported on the spring and supporting both the valve and the variable chamber, change in capacity of the variable chamber acting on the upper cup for moving the valve, and means responsive to the difference between the pressure in the evaporator and a pressure varying as the temperature adjacent the evaporator and coacting with the variable chamber in controlling movement of the valve.

12. In a control device for connection between the compression unit and the evaporator of a refrigerating system, a casing, a valve controlling the flow of refrigerant through the casing, a chamber varying in capacity responsive to change of pressure in the evaporator above a given value, a lower cup adjustably mounted in the outlet chamber, an upper cup adjustably supported on the lower cup and supporting both the valve and the variable chamber, change in capacity of the variable chamber acting on the upper cup for moving the valve, a diaphragm subjected on one side to the pressure in the evaporator and subjected on the other side to a pressure corresponding to the temperature adjacent the evaporator, and means transmitting the action of the diaphragm to the lower cup.

13. In a control device for connection between the compression unit and the evaporator of a refrigerating system, a casing, a valve controlling the flow of refrigerant through the casing, a chamber varying in capacity responsive to change of pressure in the evaporator above a given value, a spring adjustably mounted in the outlet chamber, a lower cup mounted on the spring, a second spring adjustably mounted in the lower cup, an upper cup supported on the spring and supporting both the valve and the variable chamber, change in capacity of the variable chamber acting on the upper cup for moving the valve, a bonnet secured to the casing, a diaphragm coacting with the casing to define a chamber subjected to the pressure in the evaporator and coacting with the bonnet to define a second chamber subjected to a pressure corresponding to the temperature adjacent the evaporator, and push pins extending in spaced relation through passages in the casing and transmitting movement of the diaphragm in one direction to the lower cup, the variable chamber and the diaphragm coacting in moving the valve under one set of conditions of the system and the variable chamber alone moving the valve under another set of conditions in the system.

CLARENCE L. AUGHEY.
LOURDES V. McCARTY.

REFERENCES CITED

The following references are of record in the file of this patent:

UNITED STATES PATENTS

| Number | Name | Date |
| --- | --- | --- |
| 1,913,297 | Strong | June 6, 1933 |
| 1,974,631 | Slagel | Sept. 25, 1934 |
| 1,987,948 | Smith | Jan. 15, 1935 |
| 2,148,413 | Labberton et al. | Feb. 21, 1939 |
| 2,304,316 | Newton | Dec. 8, 1942 |